(12) United States Patent
Serrano et al.

(10) Patent No.: US 7,648,056 B1
(45) Date of Patent: Jan. 19, 2010

(54) SELECTIVE SOLDERING BATH

(75) Inventors: Esteban Arturo Alvarez Serrano, Delegación Playas de Tijuana (MX); Horman Armando Millán Sánchez, Tijuana (MX)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/167,454

(22) Filed: Jul. 3, 2008

(51) Int. Cl.
*B23K 5/00* (2006.01)
*B23K 1/08* (2006.01)
*B23K 37/00* (2006.01)
*B23K 37/04* (2006.01)
*B23K 3/06* (2006.01)

(52) U.S. Cl. .......... 228/56.1; 228/33; 228/36; 228/40; 228/47.1; 228/49.5

(58) Field of Classification Search ........... 228/47.1, 228/49.2, 49.5, 56.1, 36, 40, 33, 259, 260
See application file for complete search history.

(56) References Cited

U.S. PATENT DOCUMENTS

| | | | | |
|---|---|---|---|---|
| 3,828,419 | A | * | 8/1974 | Wanner ................. 228/36 |
| 4,351,266 | A | * | 9/1982 | Ando et al. ............. 118/425 |
| 4,512,510 | A | * | 4/1985 | Kondo ................... 228/40 |
| 5,031,820 | A | | 7/1991 | Jacks et al. |
| 5,711,473 | A | * | 1/1998 | Sund .................... 228/180.1 |
| 5,782,400 | A | * | 7/1998 | Susicki ................. 228/49.5 |
| 6,011,629 | A | * | 1/2000 | Ootake et al. .......... 356/400 |
| 6,089,440 | A | * | 7/2000 | Brusha ................. 228/44.3 |
| 6,126,060 | A | * | 10/2000 | Moon ................... 228/36 |
| 6,305,596 | B1 | * | 10/2001 | Lin et al. .............. 228/125 |
| 6,655,574 | B2 | * | 12/2003 | Schouten et al. ........ 228/37 |
| 7,169,641 | B2 | | 1/2007 | Shim et al. |
| 7,253,078 | B1 | | 8/2007 | Nguyen et al. |
| 7,256,071 | B2 | | 8/2007 | Lee et al. |
| 2003/0021886 | A1 | | 1/2003 | Baele |
| 2007/0111500 | A1 | | 5/2007 | Cowens et al. |
| 2007/0152024 | A1 | | 7/2007 | Pang et al. |
| 2007/0155154 | A1 | | 7/2007 | Pang et al. |

FOREIGN PATENT DOCUMENTS

| | | |
|---|---|---|
| EP | 269822 | 6/1988 |
| JP | 54151534 A * | 11/1979 |
| JP | 55040076 A * | 3/1980 |

(Continued)

OTHER PUBLICATIONS

Seho, http://www.amtest.net/eng/produots/soldering/seho.asp, 2008.

(Continued)

*Primary Examiner*—Jessica L. Ward
*Assistant Examiner*—Carlos Gamino
(74) *Attorney, Agent, or Firm*—John L. Rogitz

(57) ABSTRACT

A solder machine uses various linear actuators to move a PWB carrier in three degrees of freedom relative to a solder bath, to facilitate safe loading and unloading of PWBs onto the carrier while the carrier is distanced from the bath, and then to move the carrier over the bath, lower it, and tilt it as necessary to effect soldering.

9 Claims, 3 Drawing Sheets

FOREIGN PATENT DOCUMENTS

| | | | | |
|---|---|---|---|---|
| JP | 56023370 | A | * | 3/1981 |
| JP | 61283454 | A | * | 12/1986 |
| JP | 01011066 | A | * | 1/1989 |
| JP | 04081270 | A | * | 3/1992 |
| JP | 04162958 | A | * | 6/1992 |
| JP | 2003273503 | A | * | 9/2003 |
| JP | 2007109959 | A | * | 4/2007 |
| WO | 0203765 | | | 1/2002 |

OTHER PUBLICATIONS

Howard Electric Instruments Inc., "Lead-Free Soldering Stations, Desoldering tools, Lead Free Solder Pots", http://www.howardelectronics.com/goot/products.html, 2008.

Alvarez, "Selective Soldering System" pending U.S. Appl. No. 11/949,959.

* cited by examiner

SELECTIVE SOLDERING BATH

FIELD OF THE INVENTION

The present invention relates generally to printed wiring board (PWB) soldering machines that dip, in two degrees of freedom, PWBs into a solder bath to effect soldering.

BACKGROUND OF THE INVENTION

Solder machines are used to dip components such as printed wiring boards into solder baths to effect mechanical-electrical connections. To undertake this dipping automatically, previous wave soldering systems have been used that have been relatively bulky to accommodate necessary conveyance of the PWBs into the solder bath at the desired locations of the PWBs. Furthermore, the bulkiness of the prior wave soldering machines has been necessitated to accommodate required soldering precision. Such prior machines have typically consumed around three square meters of valuable factory floor space.

SUMMARY OF THE INVENTION

A solder machine includes a solder bath and a frame juxtaposed with the solder bath and including a carrier configured for holding at least one component to be soldered. The carrier is movable in at least first, seconds and third degrees of freedom relative to the solder bath to solder the component.

In non-limiting embodiments the first degree of freedom is provided by tilting at least one edge of the carrier. The first degree of freedom can be provided by tilting a first edge of the carrier using a linear actuator coupled to the first edge.

A translational actuator may be provided to move the frame with carrier translationally in a horizontal plane to establish the second degree of freedom. The translational actuator can move the frame translationally in a horizontal plane between a load position, wherein the carrier is not over the solder bath to facilitate safe loading and unloading of components therefrom, and a solder position, wherein the carrier is over the bath to facilitate soldering. Furthermore, four raise/lower actuators may be provided to raise and lower the carrier along a vertical axis when in the solder position.

In another aspect, a method of soldering at least one printed wiring board (PWB) includes moving a PWB carrier in three degrees of freedom relative to a solder bath to facilitate safe loading and unloading of PWBs onto the carrier while the carrier is distanced from the bath, and to move the carrier over the bath, lower it, and tilt it as necessary to effect soldering.

In still another aspect, a solder machine includes a base holding a solder bath and a carrier support coupled to the base and movable along a vertical axis toward and away from the solder bath. A carrier frame is slidably engaged with the carrier support and can be moved in a horizontal plane toward and away from the solder bath. A PWB carrier configured for holding at least one PWB to be soldered can be tilted relative to the carrier frame from a horizontal plane.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Terms of height such as "top", "bottom", "above", "below", "upper", "lower", "higher", "lower", etc. as used herein are relative to the soldering machine when it is positioned on the floor of an assembly plant as intended.

Figure 1:
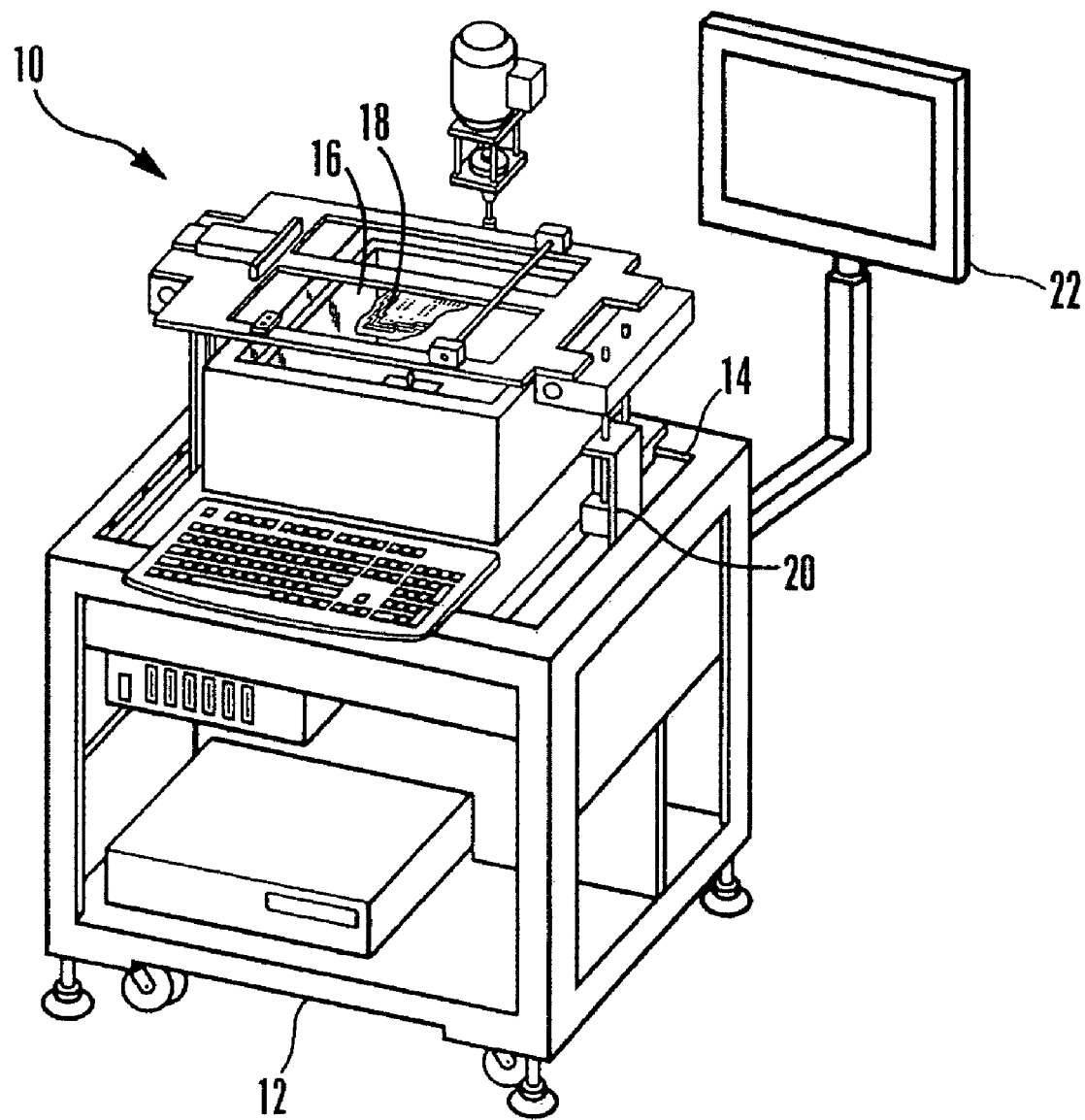
FIG. 1 is a perspective view of the present solder machine, showing PWBs on the top carrier.

Referring initially to FIG. 1, a solder machine is shown, generally designated 10, which includes a shroud or housing 12 enclosing a frame 14 that is coupled to a solder bath 16 holding solder for dip-soldering components such as printed wiring boards (PWB) 18. The solder machine 10 may support a processor 20 (shown schematically in FIG. 1) that controls motion of the frame in accordance with disclosure below. The processor 20 may output information on a computer monitor 22 if desired.

Figure 2:
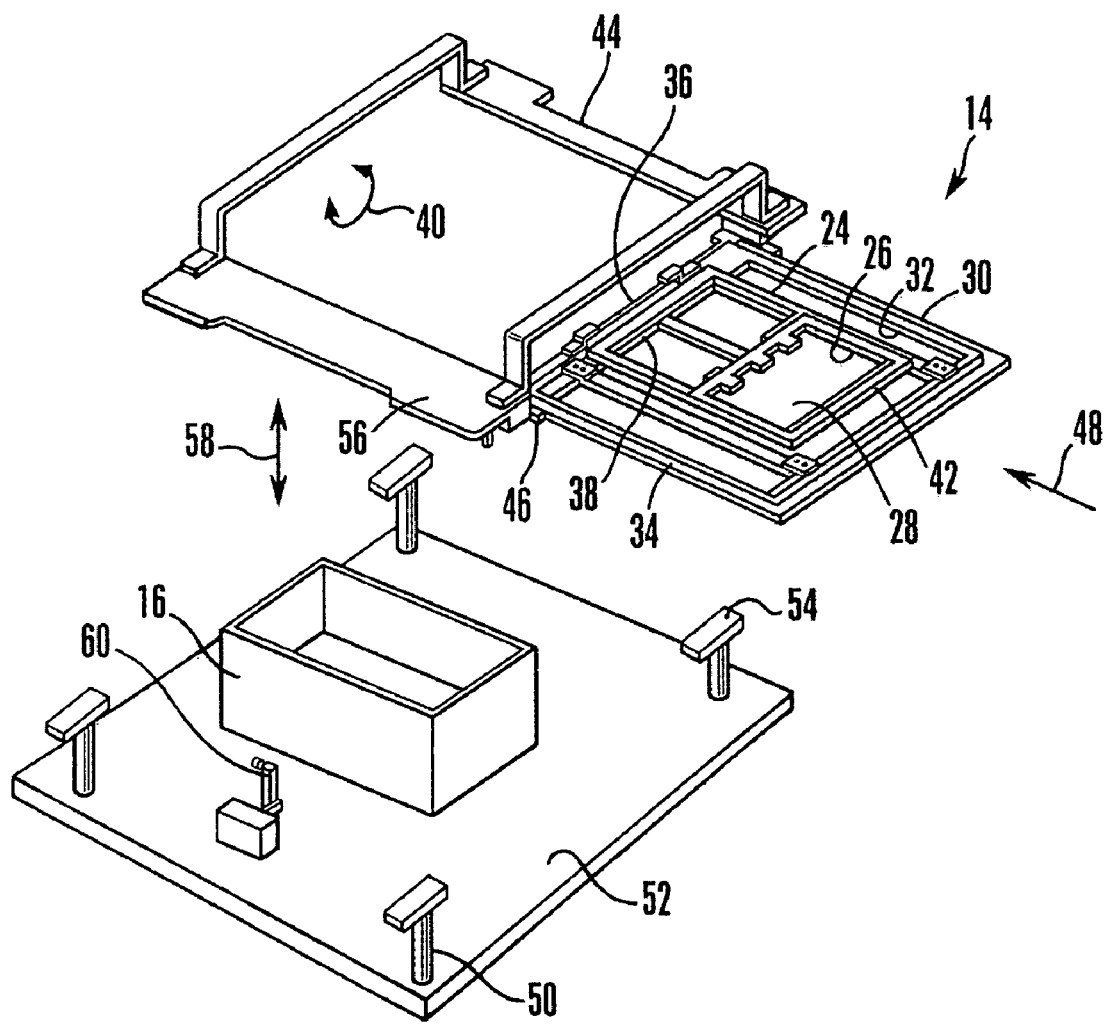
FIG. 2 is a perspective view of the present solder machine with slide piston for moving the PWB carrier in the first degree of freedom and raise/lower pistons for moving the carrier base in the second degree of freedom, showing the PWB carrier and carrier base exploded away from the solder bath for clarity and with portions of the machine removed for clarity, with the PWB carrier in the load position and the carrier support in the raised position relative to the solder bath.

Details of the frame 14 and how it moves with three degrees of freedom relative to the (non-moving) solder bath 16 can be seen in cross-reference to FIG. 2. The frame 14 includes a top flat generally rectilinear PWB carrier 24 which includes support structure 26 for supporting one or more PWBs. The PWBs may plug into the support structure 26 or may rest on it or be clamped or otherwise held by the support structure 26. It is to be appreciated that parts of the PWBs to be soldered extend below a central cavity 28 defined by the carrier 24 and toward the solder bath below, so that as the carrier 24 is moved in accordance with disclosure below the portions of the PWBs are dipped into molten solder.

The PWB carrier 24 is pivotably coupled to a hollow rectilinear carrier frame portion 30 that surrounds the PWB carrier 24. Specifically, the carrier frame portion 30 has sides 32, 34 that are distanced from adjacent sides of the PWB carrier 24 and a solder bath edge 36 that is pivotably coupled to a solder bath edge 38 of the PWB carrier 24, such that the PWB carrier 24 can pivot relative to the carrier frame portion 30 about the solder bath edge 38 as indicated by the arrows 40. In other words, when the structure described below pivots the PWB carrier 24, the edge 42 of the PWB carrier 24 that is opposite the solder bath edge raises (in one direction of the pivot) and lowers (in the other direction of the pivot) relative to the carrier frame portion 30.

As briefly described above, in FIG. 2 the PWB carrier 24 is in a load position and a hollow generally rectilinear carrier support 44 is in a raised position relative to the solder bath. It is to be appreciated that the carrier frame portion 30 is slidably engaged with the carrier support 44.

With more specificity, in FIG. 2 the PWB carrier 24 is distanced in the horizontal dimension from the solder bath 16, so that PWBs can be loaded on and unloaded off the PWB carrier 24 by a person while the PWB carrier 24 is relatively safely distanced from the solder bath. When the PWBs have been loaded on to the PWB carrier 24, a translational linear actuator 48 that is coupled to the carrier frame portion 30 is actuated to translationally move the carrier frame portion 30 with PWB carrier 24 in the horizontal plane in the direction indicated by the arrow 48 to a solder position, in which the carrier frame portion 30 is surrounded by the carrier support 44 and in which the PWB carrier 24 is juxtaposed with the solder bath 16.

As can be appreciated in reference to FIG. 2, four raise/lower linear actuators 50 couple respective corner areas of a solder bath base 52 to the carrier support 44. Specifically, respective flat top pads 54 of the raise/lower actuators 50 can engage respective corner flanges 56 of the carrier support 44 such that when the raise/lower actuators 50 are activated, they can move the carrier support 44 down along the vertical axis as indicated by the arrows 58 toward the solder bath 16 to a lowered position, and then back tip again to the raised position shown in FIG. 2. In some embodiments pivotable motion between the raise/lower actuators 50 and flanges 56 may be provided for so that, e.g. two of the four actuators 50 may be actuated to tilt the carrier support 44 relative to the solder bath 16. In the embodiment shown in FIG. 2, however, all four raise/lower actuators 50 work in concert to raise and lower the carrier support 44 while the support 44 remains substantially flat in the horizontal plane.

Figure 3:
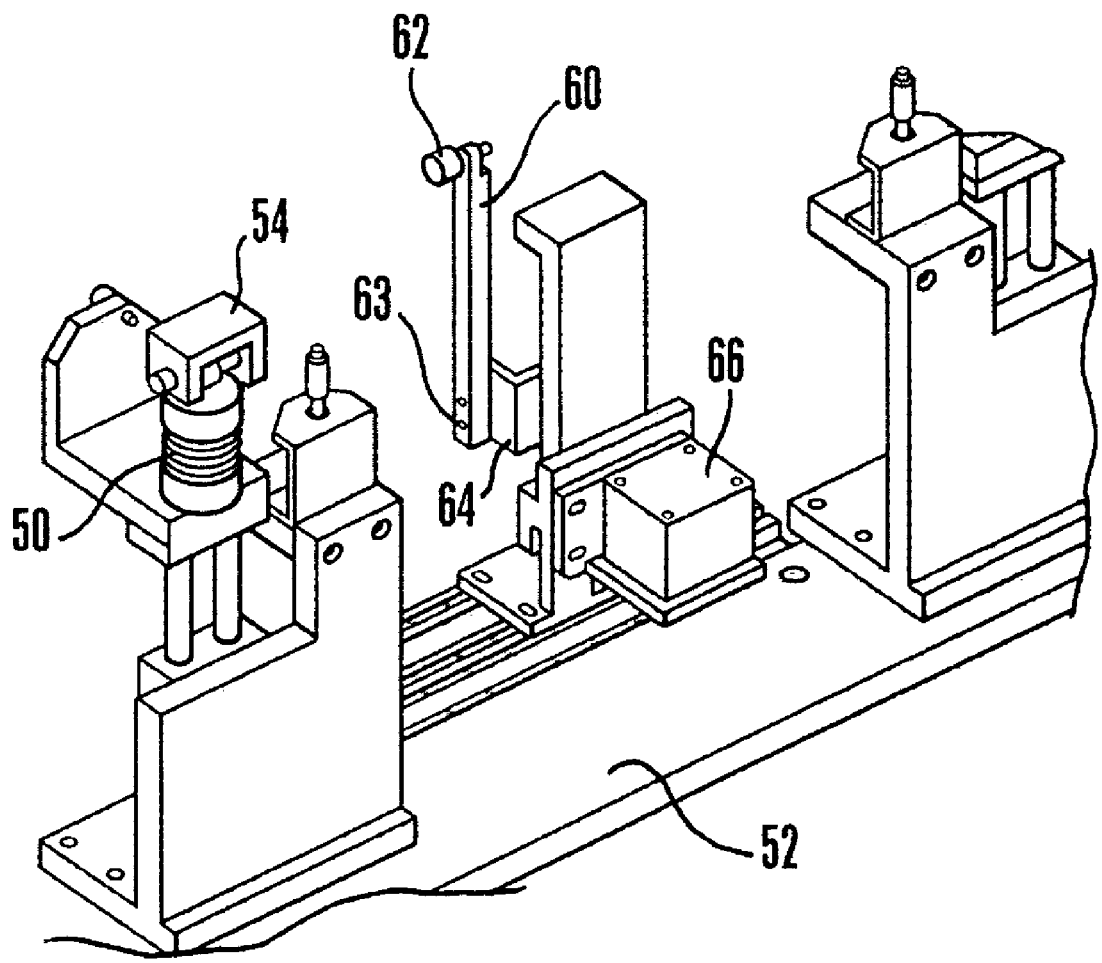
FIG. 3 is a perspective view of the tilt mechanism that pivots the carrier in the third degree of freedom.

With the PWB carrier 24 in the solder position and the carrier support 44 in the lowered position, as mentioned above the PWB carrier 24 can pivot relative to the carrier frame portion 30 about the solder bath edge 38 as indicated by the arrows 40. In one non-limiting implementation this pivoting may be effected by a pivot arm 60, shown in FIG. 2 and best shown in FIG. 3, which will now be referenced. As shown, the pivot arm 60 has a free end which may be coupled to a rubber or plastic cylindrical grommet-like pad 62. The pad 62 contacts the bottom of one of the sides of the PWB support 24 when the apparatus is in the solder, lowered position. The opposite end 63 of the pivot arm 60 is coupled through, e.g., a hall screw coupling 64 to a stepper motor 66 to pivot the arm 60 between the vertical orientation shown toward a horizontal orientation. It will readily be appreciated that this pivoting motion causes the pad 62 and, hence, the side of the PWB carrier 24 to which it is coupled to raise and lower as desired, which tilts the PWB carrier 24 as described.

The operation of the solder machine may now be appreciated. To load a PWB onto the PWB carrier 24, the carrier support 44 is raised and the carrier frame slid away from the solder bath to the load position of FIG. 2. An operator can safely load PWBs onto the PWB carrier 24 with minimal exposure to the solder bath. Then, the translation actuator is activated to pull the carrier frame 30 within the carrier support 30, over the solder bath. The raise/lower actuators are next activated to lower the carrier support 44 toward the solder bath, and then the tilt actuator with pivot arm 60 activated to tilt the PWB carrier 24 as appropriate for the soldering sought to be effected. At the completion of soldering the above operations are reversed to permit the operator to safely offload soldered PWBs.

While the particular SELECTIVE SOLDERING SYSTEM is herein shown and described in detail, it is to be understood that the subject matter which is encompassed by the present invention is limited only by the claims. For example, pistons may be used but other linear actuators such as rack-and-pinion style actuators driven by, e.g., stepper motors may be used.

What is claimed is:

1. A solder machine, comprising:
a base holding a solder bath;
a carrier support coupled to the base and movable along a vertical axis toward and away from the solder bath;
a carrier frame slidably engaged with the carrier support and movable in a horizontal plane toward and away from the solder bath; and
a printed wiring board (PWB) carrier configured for holding at least one PWB to be soldered and tiltable relative to the carrier frame from a horizontal plane, wherein the PWB carrier is tilted by a tilt actuator engaged with a side of the PWB carrier, the tilt actuator including a pivot arm having a free end juxtaposed with the PWB carrier and a coupling engaging the pivot arm with a motor to pivot the arm between a vertical orientation toward a horizontal orientation.

2. The solder machine of claim 1, wherein the carrier frame is slid relative to the carrier support by at least one translational linear actuator.

3. The solder machine of claim 2, wherein the carrier support is raised and lowered by at least one raise/lower actuator.

4. The solder machine of claim 3, comprising four raise/lower actuators.

5. The machine of claim 1, wherein the motor is a stepper motor.

6. A solder machine, comprising:
a base holding a solder bath;
a carrier support coupled to the base and movable along a vertical axis toward and away from the solder bath;
a carrier frame slidably engaged with the carrier support and movable in a horizontal plane toward and away from the solder bath; and
a PWB carrier configured for holding at least one PWB to be soldered and tiltable relative to the carrier frame from a horizontal plane;
a pivot arm having a free end juxtaposed with the PWB carrier; and
a coupling engaging the pivot arm with a motor to pivot the arm between a vertical orientation toward a horizontal orientation, wherein the free end is coupled to a rubber or plastic grommet-like pad contacting a bottom of the PWB carrier when the solder machine is in a solder position, an end of the pivot arm opposite the free end being coupled through a coupling to the motor to pivot the arm between the vertical orientation toward the horizontal orientation.

7. The solder machine of claim 6, wherein the carrier frame is slid relative to the carrier support by at least one translational linear actuator.

8. The solder machine of claim 6, wherein the carrier support is raised and lowered by at least one raise/lower actuator.

9. The solder machine of claim 6, comprising four raise/lower actuators.

* * * * *